US005472134A

United States Patent [19]
Gunnell et al.

[11] Patent Number: 5,472,134
[45] Date of Patent: Dec. 5, 1995

[54] WELD JOINT CONTAINER

[75] Inventors: Lyle P. Gunnell, Hartland; Roger A. Heins, Milwaukee; Carl A. Soczka, Greenfield, all of Wis.

[73] Assignee: Harnischfeger Corporation, Brookfield, Wis.

[21] Appl. No.: 209,765

[22] Filed: Mar. 14, 1994

[51] Int. Cl.⁶ .............................. B23K 25/00; B23K 37/00
[52] U.S. Cl. .............................. 228/44.3; 228/46; 228/50; 219/73.1
[58] Field of Search .............................. 228/44.3, 46, 50, 228/19, 215, 216, 171, 142; 219/73.1

[56] References Cited

FOREIGN PATENT DOCUMENTS

| | | | |
|---|---|---|---|
| 886174 | 11/1971 | Canada | 219/73.1 |
| 1203893 | 10/1965 | Germany | 219/73.1 |

OTHER PUBLICATIONS

*Metals Handbook 9th edition*, "Electroslag Welding", vol. 6, pp. 225–237, 1983.
Lincoln Electric Company literature entitled "0.120" NR–431 Consumable Guide" N431G6G, dated Jul. 1988, pp. 1 & 2.
Lincoln Electric Company literature entitled "Process Information and Procedure Guidelines, Verti–Shield Butt Welds on ¾" through 4" Plate" NP–CG–B, dated May 23, 1986 and amended Oct. 10, 1986, pp. 1–22.

*Primary Examiner*—P. Austin Bradley
*Assistant Examiner*—Jeanne M. Elpel
*Attorney, Agent, or Firm*—Richard C. Ruppin

[57] ABSTRACT

A joint container for forming a weld joint utilizing multiple adjacent metal plates which are spaced apart and positioned angularly to each other. One of the plates forming the joint may extend continuously through the joints along a straight line. At least first and second plates of the multiple plates may be at an acute angle to each other. A dam member is placed in each of the spaces between each two adjacent plates. The dam member between adjacent plates has a concave contour surface viewed in a direction toward the weld joint container. Thereby stress inducing sharp corners in the finished weld joint are minimized due to the reduction of the angles of the corners provided by the contour of each dam surface when it engages one of the plates. Also, the plates having ends at the joint have such ends cut parallel to and spaced from the plate extending continuously straight through the joint. This parallel relationship of the plate ends with the continuous plate also stress inducing sharp corners in the weld joint.

7 Claims, 3 Drawing Sheets

WELD JOINT CONTAINER

FIELD OF THE INVENTION

This invention relates to a container apparatus for forming a weld joint for joining together steel plates. More specifically, the invention relates to a weld joint container for forming a joint at the juncture area of a plurality of steel plates which are disposed at angles relative to each other.

BACKGROUND OF THE INVENTION

The welding together of steel components and assemblies of large structures and other equipment is a time consuming and difficult process where the work is done by hand. Typical of such equipment are surface mining draglines and shovels constructed of steel plates having various reinforcing designs. The welding problems are particularly difficult at junctures of multiple plates where the plates form acute angles such that the junctures at which the welds are to be placed are very difficult to reach. Other problems associated with such welding is plate distortion where portions of the entire weld joint must be done in a step by step manner, incomplete fusion of the weld material to chamfered edges of steel plates, the need for numerous weld passes where many stops and starts are necessary, and the requirement of cascaded ends for correct tying in of the weld layers.

Welding apparatus and processes for forming weld joints at steel plate junctures have been developed which eliminate many of the aforementioned problems. However, such apparatus and methods are not suitable for use in welding multiple plates forming a complex joint with acute angles between adjacent plates at the weld joint area.

SUMMARY OF THE INVENTION

It is a general object of the invention to provide a weld joint container apparatus for forming a weld joint at the juncture of multiple steel plates. It is a further object of the invention to provide a weld joint container for forming a weld joint at the juncture of steel plates forming acute angles between adjacent plates and in which the ends of the plates may form a part of the walls of the weld joint container.

The invention is accomplished by providing a weld joint container utilizing multiple adjacent metal plates which are spaced apart and positioned angularly to each other. At least first and second plates of the multiple plates may be at an acute angle to each other. A dam member is placed in each of the spaces between each two adjacent plates, the dam member between the first and second plates having a concave contour surface viewed in a direction toward the weld joint container. Thereby a stress inducing sharp corner in the finished weld joint is minimized due to the reduction of the sharpness of the corner provided by the contour of the dam surface when it engages one of the plates.

One of the plates forming the joint may extend continuously through the joints along a straight line. Further, it is preferable that the plates other than the continuous plate at joint have their ends cut parallel to and spaced from the plate extending continuously straight through the joint.

BRIEF DESCRIPTION OF THE DRAWINGS

Further objects and advantages of the invention will appear when taken in conjunction with the accompanying drawings in which.

DETAILED DESCRIPTION OF THE INVENTION

Figure 1:
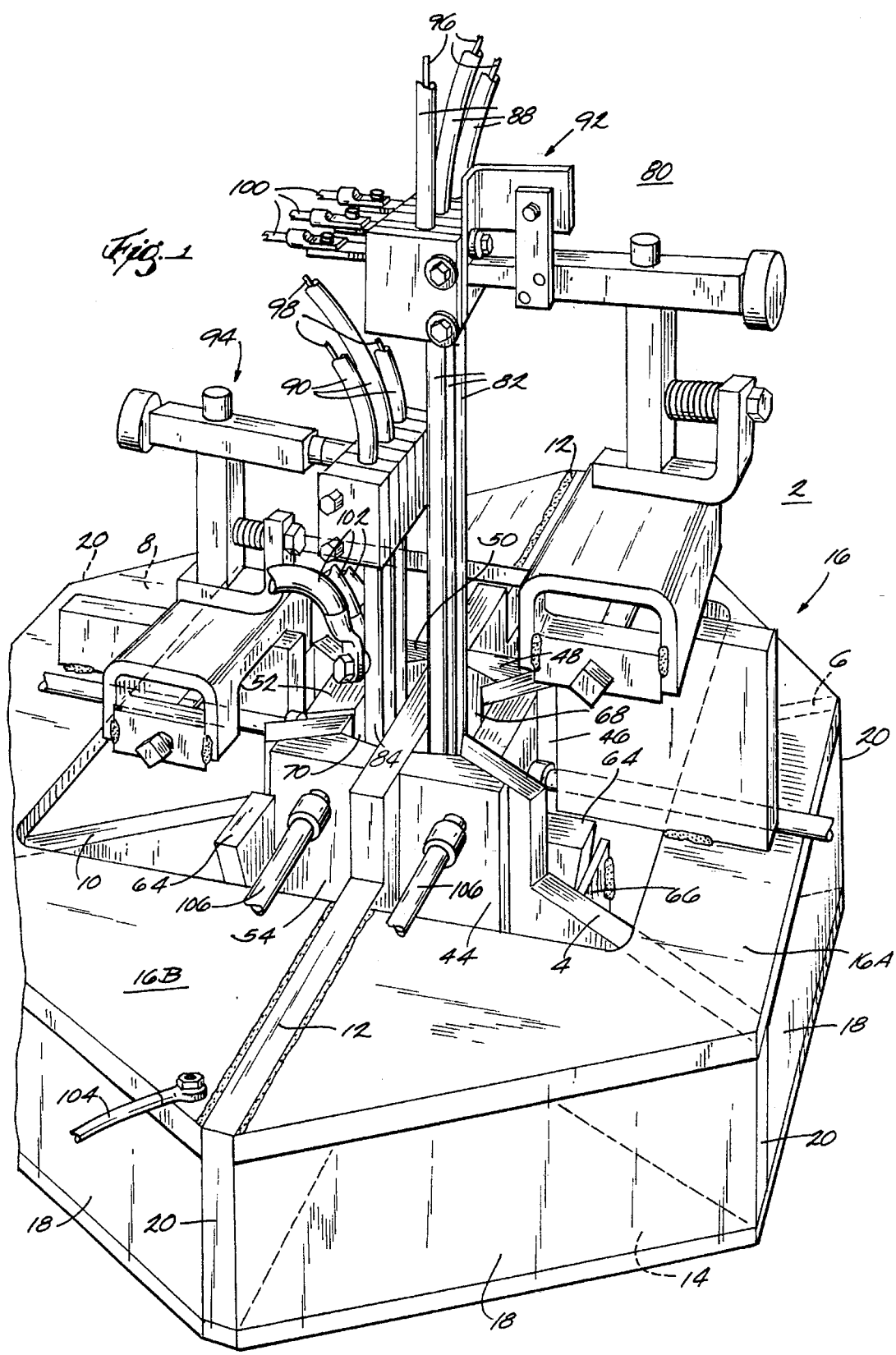
FIG. 1 is a perspective view of a steel structure in which the weld joint container according to the invention is utilized to form a weldment of plates forming the structure.

Referring generally to FIGS. 1–4, an apparatus for welding a plurality of plates together to form a joint is illustrated. The plates form part of a steel tub structure 2 and are designated by the numerals 4, 6, 8, 10 and 12. The tub structure 2 is part of the ground engaging base of a dragline machine (not shown) used in surface mining operations. The tub structure has a hexagonal shape when viewed from above and includes a floor 14, a top 16 having sections 16A and 16B, and sides 18 connecting to the floor 14 and the top 16 and connected to each other to form a continuous outer peripheral wall of the steel tub structure. The plates 4, 6, 8, 10 and 12 extend in radial directions including to an outer joint location of two adjacent sides 18 and join to such sides at outer joints 20 which also connect such sides. Each of the plates 4, 6, 8 and 10 also extend radially inward from the joints 20 to a center joint 22. The plate 12 is a longer plate which extends along a straight line continuously through the center joint 22 between two of the radially outer joints 20.

Figure 2:
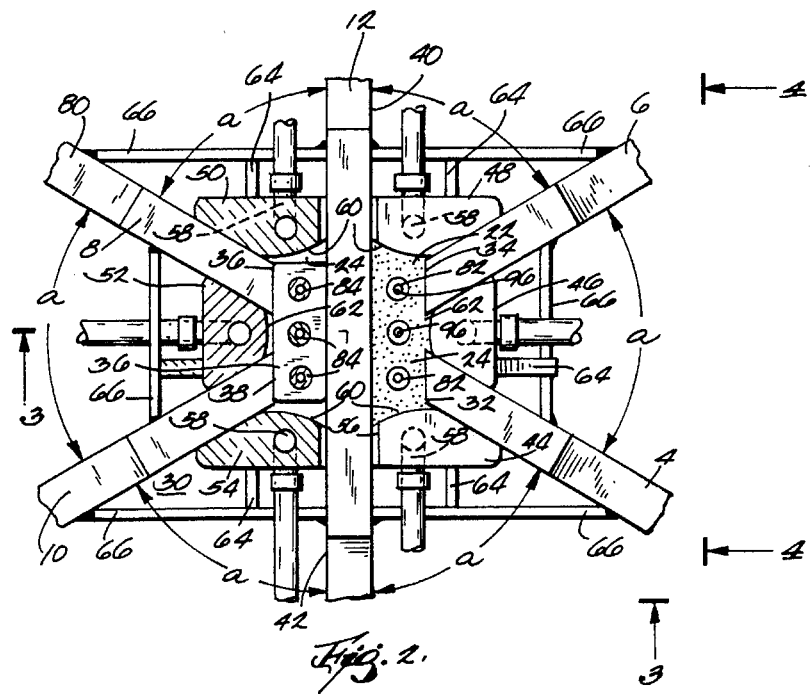
FIG. 2 is a plan view, partially in cross-section, of the weld joint container at the juncture of the angular steel plates of the structure shown in FIG. 1.
Figure 3:
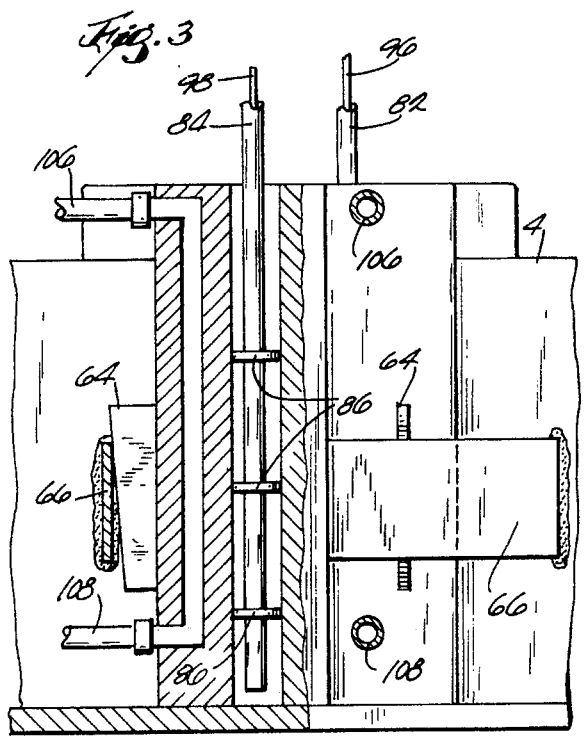
FIG. 3 is a side elevation view, partially in cross-section, of the weld joint container illustrated in FIG. 2.
Figure 4:
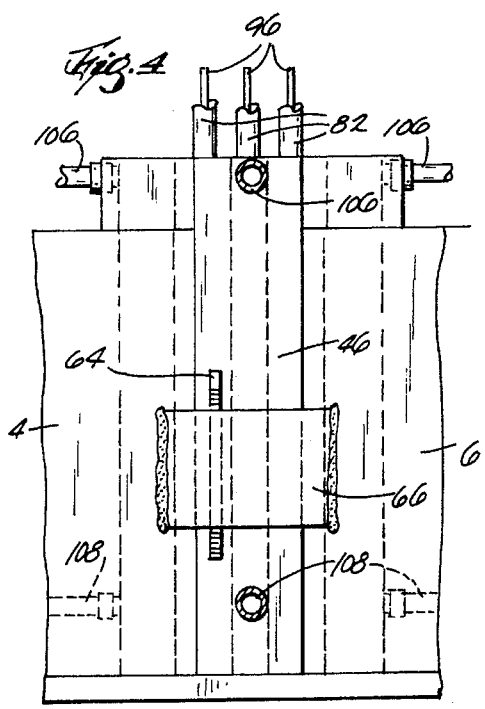
FIG. 4 is a front elevation view of the weld joint container shown in FIGS. 1 and 2.

With reference to FIGS. 1–4, the weld joint container 30 comprises the plate 12 and ends 32, 34, 36 and 38 respectively of plates 4, 6, 8 and 10. The plate 12 divides the container 30 into two sections 68 and 70. The plates 4, 6, 8 and 10 each extend toward the center joint 22 at an angle relative to each other and at an angle relative to the plate 12 in the tub structure 2. The angle a between each adjacent plate is sixty degrees and the arrangement of the plates is symmetrical. Although in the joint 22, adjacent plates extending from the joint are at the same angle relative to each other, the invention includes an arrangement in which the plates are not at the same separating angle and the plate arrangement therefore is not symmetrical. The ends 32, 34, 36 and 38 also are cut or positioned such that, even though the plate with which each such end is associated is at an angle relative to the plate 12, the ends are parallel to and spaced from the sides 40 or 42 of the plate 12. The parallel positioning of the ends of the plates 4, 6, 8 and 10 relative to the plate 12 eliminates or minimizes sharp corners and resulting stress in the weld joint 22. The weld joint container 30 further includes weld dams 44, 46, 48, 50, 52 and 54. The dams 44, 48, 50 and 54 contain slag draining slots 56. Each of the dams is water cooled and includes water passages 58 and 59 through which water flows during a welding operation. As can be best seen in FIG. 2, each of the dams 44, 48, 50 and 54 have a concave contoured surface 60 in a direction toward the weld joint and the joint container, and the weld dams 46 and 52 each have a concave contour surface 62 toward the weld joint and the joint container. The concave contour surfaces 60 and 62 engage the plates between which each dam is located at a minimum angle which may be an obtuse angle to thereby minimize the stress in the center joint 22 which is normally present at sharp angles in a welded joint. As can be seen in FIGS. 2 and 3, each of the weld dams is also held in place by a wedge 64 between the dam and a strap 66 welded between adjacent plates.

Referring again to FIG. 1, a welding apparatus 80 is illustrated for use with the weld joint container 30 to weld the plates together. The welding apparatus 80 includes three consumable weld wire guide tubes 82 extending into section 68 of the weld joint container 30 and three consumable weld wire guide tubes 84 extending into section 70 of the joint container 30. The guide tubes each include consumable spacers 86 which are of an electrically insulating material and prevent arcing between the guide tubes and the dams or plates during the welding process. Wire feed tubes 88 are connected to the guide tubes 82 and wire feed tubes 90 are connected to the guide tubes 84. Weld wires 96 are moved through the feed tubes 88 and guide tubes 82 and weld wires 98 are moved through the feed tubes 90 and guide tubes 84 by suitable means (not shown) into the weld joint container 30. The wire feed tubes 88 and the wire guide tubes 82 are held in position above the weld area by a clamp 92. Similarly, the wire feed tubes 90 and the wire guide tubes 84 are held in position above the weld area by a clamp 94. An electrical power source (not shown) is connected through three cables 100 at the clamp 92 to the weld wires 96 and also connected through three cables 102 at the clamp 94 to the weld wire 98. The electrical welding circuit is through the cables 100 and 102 and the steel structure 2 and a ground cable 104 connected to the steel structure 2. Water feed hoses 106 and 108 for each of the weld dams 44, 46, 48, 50, 52 and 54 are also shown in FIGS. 1–4. The welding apparatus 80 and the welding procedure are similar to that shown in Lincoln Electric Company literature entitled "0.120" NR-431 Consumable Guide" N431G6G, dated Jul. 1988, and "Process Information and Procedure Guidelines, Verti-Shield Butt Welds on ¾" through 4"Plate", NP-CG-B, dated May 23, 1986 and amended Oct. 10, 1986.

In beginning the welding procedure, the weld wires 96 and 98 are extended downward through the guide tubes 82 and 84 to adjacent the floor 14 of the weld joint container 30. An arc is struck between the weld wires 96 and 98 and the floor 14 such that the weld wire is melted to begin the formation of the weld metal portion 24 of the center joint 22. As the weld wire melts to fill the weld joint container 30, the weld wire is fed into the weld joint container 30 to provide additional melted weld material and the consumable guide tubes also melt to contribute melted weld material. While the weld wires are melting to form the weld portion 24 of the joint 22, water is circulated by the water feed hoses 106 and 108 through the dams to reduce the temperature of the plates and weld material. Upon the filling of the weld joint container 30 by the weld metal 24, the electrical power through the cables 102 is disconnected. Slag on the surface of the molten weld material 24 is drained through the drain slots 56. Upon solidifying of the molten weld material 24, the welding apparatus 80 and the weld dams and connected water feed hoses are removed from the weld area.

Figure 5:
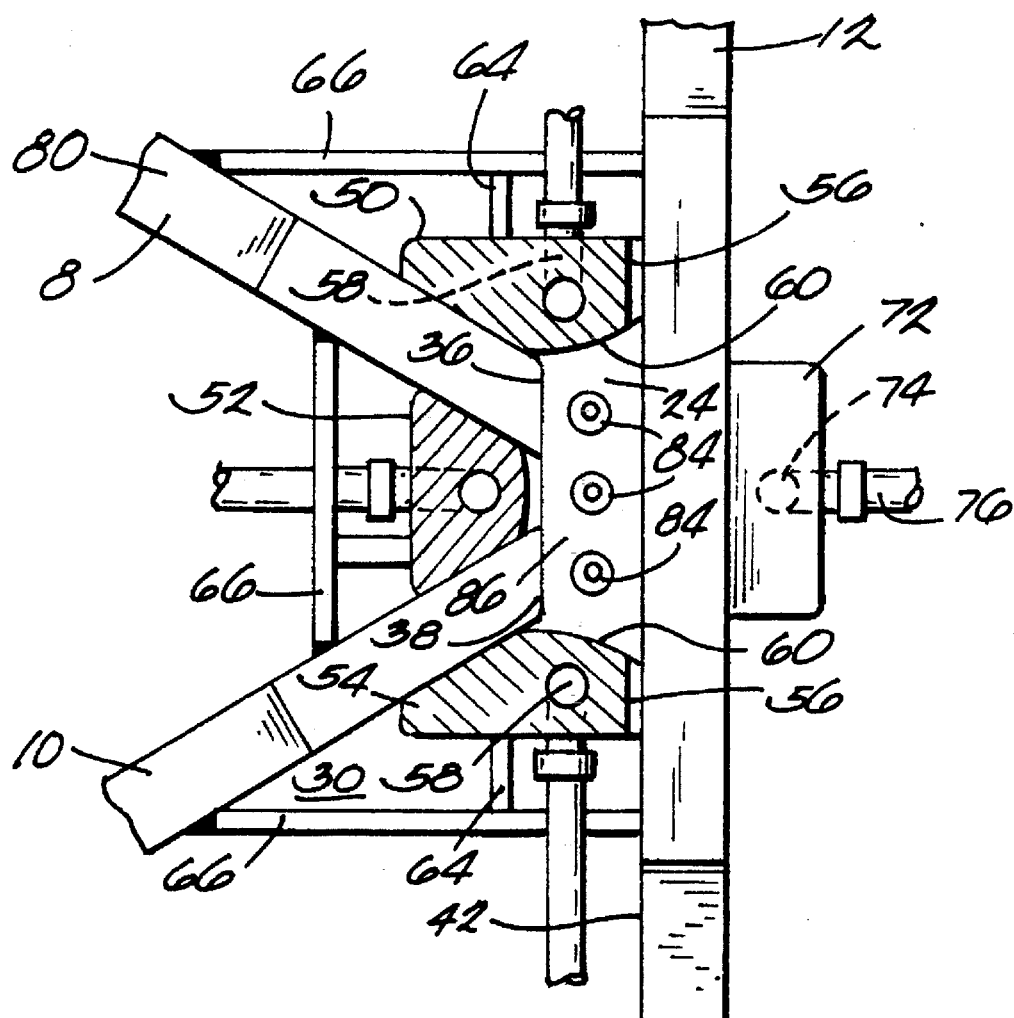
FIG. 5 is a plan view of an alternate embodiment of the invention.

An alternate embodiment of the invention is shown in FIG. 5. The components of the invention shown in FIG. 5 which are identical to those in the embodiment of FIGS. 1–4 carry the same identifying numerals. In FIG. 5, the continuous straight line plate 12 bounds one side of the weld joint container 30 and the plates 8 and 10 extend toward the container 30 and have spaced parallel ends respectively 36 and 38 relative to the length of the plate 12. The dams 50, 52 and 54 are positioned between the plates and together with the plates 8 and 10 form the sides of the joint container 30. The dams 50 and 54 each have concave contoured surfaces 60 and the dam 52 has a concave contoured surface 62 facing the weld joint container 30. The dams also include water cooling passages 58 connected to water supply hoses 106 and 108. A chill bar 72 is also positioned against the plate 12 adjacent the joint container 30 for reducing plate temperature during welding. The chill lever includes a water cooling passage 74 connected to a water supply hose 76. The dams 50, 52 and 54 are held snugly in position by straps 66 and wedges 64. Weld wire guide tubes 84 containing weld wires 98 extend into the joint container. The forming of the weld joint 22 utilizing the invention according to FIG. 5 is accomplished in essentially the same manner as the forming of the weld joint container section 68 described with reference to FIGS. 1–4.

A weld joint 22 is thus formed which has a relatively uniform weld material thickness between adjacent welded plates and a minimum of sharp corners in the weld joints. Moreover, a very complex weld joint is made with relative ease which does not require separately reaching into each relatively narrow angular joint space between each adjacent pair of plates to be welded. In addition, the welding in a single pass of the entire joint reduces separate deformation of each weld area as that area is being welded to thereby eliminate stress and possibly cracking adjacent welded areas.

It will be understood that the foregoing description of the present invention is for purposes of illustration only and that the invention is susceptible to a number of modifications or changes, none of which entail any departure from the spirit and scope of the present invention as defined in the hereto appended claims.

What is claimed is:

1. A weld joint container for forming a weld joint to weld metal plates together comprising:

a plurality of adjacent spaced apart metal plates positioned angularly to each other, at least a first one of the plurality of plates being at an acute angle relative to a second adjacent plate, a third one of the plurality of plates extending along a straight line continuously through the weld joint and the first and second plates are each at an acute angle relative to the third plate; and a dam member in the space between each adjacent two plates, the dam member between the first and second plates having a concave contour surface viewed in a direction toward the weld joint container whereby a stress inducing sharp corner in the weld joint is minimized.

2. The weld joint container according to claim 1 wherein the first and second plates each have an end parallel to and spaced from the third plate.

3. The weld joint container according to claim 1 wherein:

the third plate has a pair of opposite sides, the first and second plates being positioned adjacent one of said sides; and the plurality of plates further include fourth and fifth plates each at an acute angle relative to the third plate and positioned adjacent the other of said sides.

4. The weld joint container according to claim 3 wherein the third plate extends through the weld joint container and separates the latter into two sections.

5. The weld joint container according to claim 4 wherein each dam member between the third plate and a plate most adjacent the third plate has a side engaging said most adjacent plate and diverging out of contact with the most adjacent plate to form a concave weld.

6. A weld joint container for forming a weld joint to weld metal plates together comprising:

a plurality of adjacent spaced apart metal plates, one of said plurality of plates extending continously through the weld joint in a straight line and having a pair of opposite sides, each other plate of the plurality of plates being positioned at an acute angle relative to said one plate and having an end parallel to and spaced from the one plate, a at least one of the other of the plates being positioned adjacent one of said sides and a second at least another of the other of the plates is positioned adjacent the other of said sides; and a dam member in the space between each adjacent two plates.

7. The weld joint container according to claim 6 wherein each dam member has a concave contour surface viewed in a direction toward the weld joint.

\* \* \* \* \*